Oct. 12, 1926.  
C. F. RICHEY ET AL  
1,602,552  
HIGH PRESSURE HEAT EXCHANGER  
Filed July 14, 1924
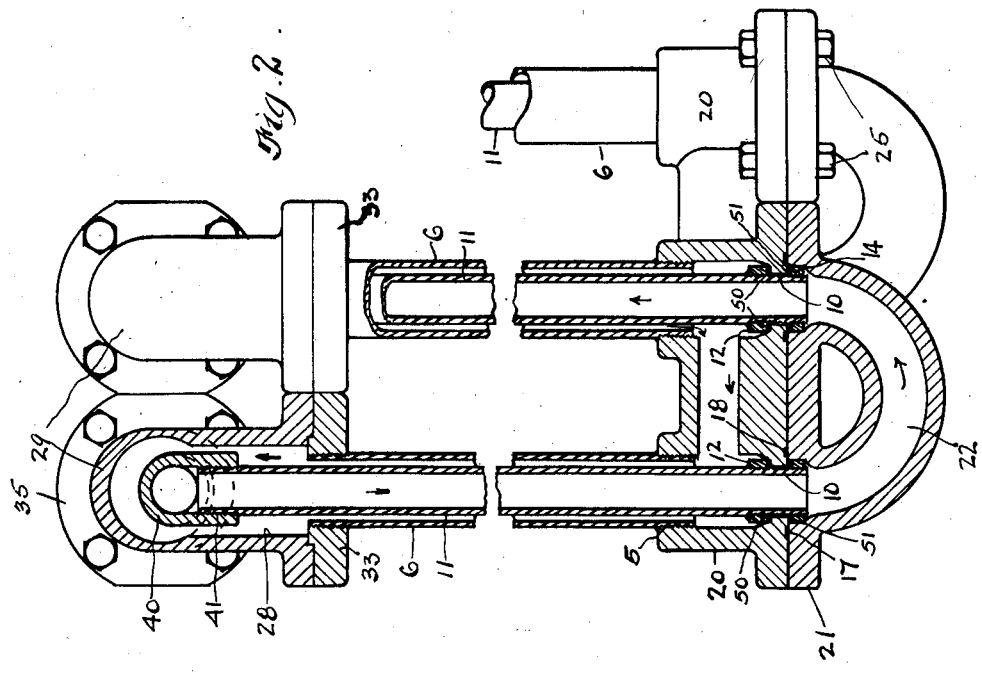
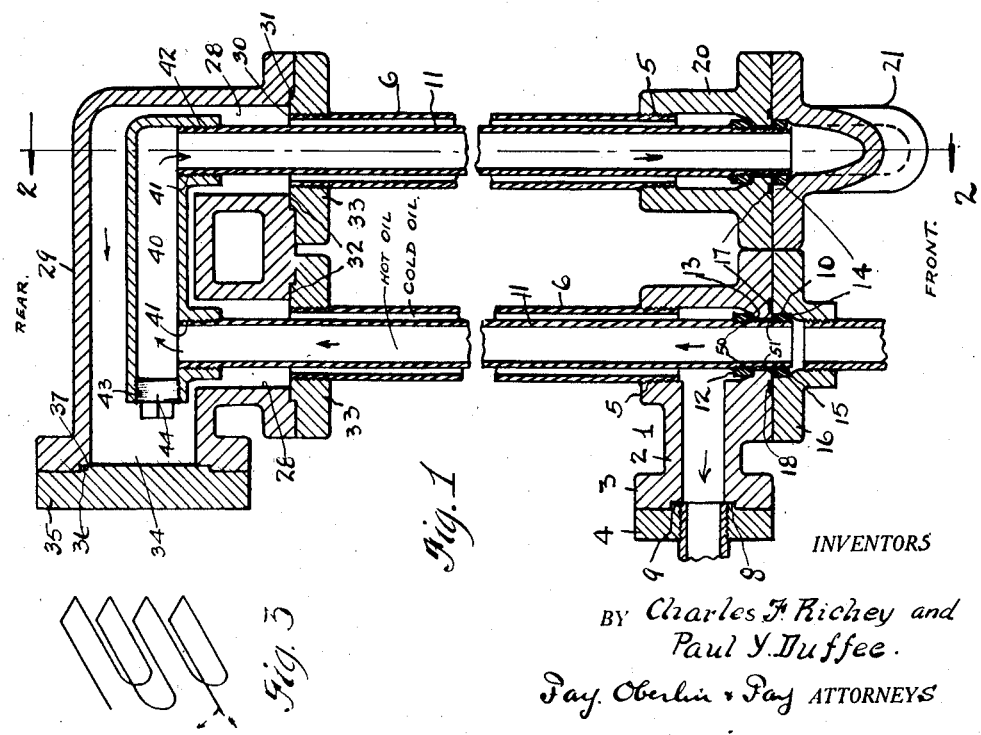
INVENTORS
BY Charles F. Richey and
Paul Y. Duffee.
Fay, Oberlin & Fay ATTORNEYS Patented Oct. 12, 1926.

1,602,552

UNITED STATES PATENT OFFICE.

CHARLES F. RICHEY AND PAUL Y. DUFFEE, OF FRANKLIN, PENNSYLVANIA, ASSIGNORS, BY MESNE ASSIGNMENTS, TO THE MOTOR FUEL CORPORATION, OF FRANKLIN, PENNSYLVANIA, A CORPORATION OF PENNSYLVANIA.

HIGH-PRESSURE HEAT EXCHANGER.

Application filed July 14, 1924. Serial No. 725,770.

The present invention relates to a high pressure heat exchanger or preheater, and more particularly to a heat exchanger for use in an oil cracking apparatus, for preheating the oil fed to the cracking furnace by the hot oil coming from the furnace. In such construction it is necessary to handle oil at both very high pressure and temperature and the present construction provides means for taking care of the expansion and contraction.

The present heater also provides double tubes, the hot oil being carried in the inner tube and being surrounded at all times by much cooler oil at the same pressure until the temperature of the hot oil has been so materially reduced that the tubes are capable of sustaining the stresses without the supporting oil under pressure. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a horizontal sectional view through a section of the exchanger; Fig. 2 is a vertical sectional view through a section but showing parts in elevation; and Fig. 3 is a diagrammatic view to show the general arrangement and direction of flow.

The present heat exchanger comprises a series of double pipes connected together to form two continuous chambers, the inner chamber being adapted to carry the hot oil and the outer chamber the cool oil to be heated. The connecting units are so arranged that independent expansion of the inner and outer tubes is provided.

In Fig. 1 is shown an inlet or connecting header for both pipes comprising a hollow casting 1, having an outlet branch 2, with a connecting flange 3 for attachment to a complementary flange 4 carrying the connecting pipe. The connecting flange 3 is provided with an annular recess 8 and the complementary flange with a raised annular portion 9 to form a tight joint. The interior of the casing is hollow and at the rear is a threaded aperture 5 to which the large or outer tube 6 is connected. In the front of the casting is an opening or aperture 10 adapted to receive the inner tube 11 which is provided with a fixed nut 12, and a gasket 50 on the inside seating against a shoulder 13 of the casting. A similar tightening nut 14 is mounted on the outer end of the pipe 11, with a gasket 51 between the outer face and the nut to lock the pipe securely in place, and this nut 14 is received in a recess 15 in the connecting flange 16. A packing groove 17 is formed in the face of the casting and a washer 18 inserted to form a tight joint at this point. This same connecting casting is used at both ends of the preheater for connecting to the pipes for the cool and hot oil.

At the right hand side of the unit in Fig. 1 at the front is a connecting casting 20, best shown in Fig. 2, and similar interiorly to the casting 1, except that it provides two threaded apertures 5 at the rear for two large tubes 6, and two aligned openings or apertures 10 at the front for the smaller inner tubes, with two recesses 17 for the packing washers 18. In these connecting headers, the connecting flange 21 fits over both apertures and is provided with an interior passageway 22 enlarged at each end to provide a seat for the tightening nuts 14 on the outer ends of the tubes 10, the header being secured in place by bolts 25 or the like.

At the rear of the device the connecting heads for the two sets of tubes are mounted. These heads are separate and the connecting head for the outer tubes 6 is a hollow casting 29 having two hollow extensions 28 terminating in spaced apertures 30 on its forward face. Around the apertures is an annular recess 31 adapted to receive a complementary shoulder 32 formed on the connecting flange 33, which is threaded on to the end of the outer tube 6.

At one end the connecting casting has a large opening 34 adapted to be sealed by a plug 35 formed with a shoulder 36 which fits a recess 37 in the casting. The connecting unit 40 for the inner tubes is inserted in the casting through the opening 34 and this unit is hollow and has two spaced internally threaded extensions 41 adapted to receive the extending threaded ends 42 of the inner tubes 11. The end opening 43 of the unit is closed by a threaded plug 44. This unit floats within the connecting casting for the large tubes and thus provides for the unequal expansion of the tubes. The flanges are all bolted in place, as best illustrated in Fig. 2.

In making a high pressure heat exchanger, the number and length of tubes is determined according to the amount of fluid to be handled and the exchanger built up. As the pressure is the same in both tubes, the joints, particularly those in the front headers, do not tend to leak from one system to the other. In the present device the parts are so arranged that by removing the caps and connecting flanges, the parts may be readily cleaned, if necessary, or any tube or other part replaced without tearing the entire structure apart. Seamless steel tubes may be employed and the headers are made sufficiently strong to withstand the high pressures involved. The flange connections are all secured by bolts and may be drawn tightly together to prevent leakage. It is of course understood that the hot oil flows through the inner tubes in the opposite direction to the oil in the outer tubes, as best shown by the arrows on Fig. 1. When the hot oil under the high pressures used is forced through the small tubes, their temperature is raised to a point sufficient to reduce the strength of the tubes and in the present construction the use of the large outer tubes allows the inner tubes B to be encased in a cylinder of relatively cool oil under the same pressure as the oil in the inner tubes so that the hot oil tubes are relieved of the burden of taking the high pressure. By the time the hot oil has passed through the heat exchanger the temperature has been reduced to such a point that the small tubes can handle the stresses and thus the danger of tube rupture is materially reduced.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a heat exchanger, the combination of an inlet and outlet header, means in said header for securing two tubes in spaced concentric relation, a header at the rear for connecting two pairs of concentric tubes comprising an outer casting provided with means for attachment to the outer tubes, and an inner connecting head provided with means for removable attachment to the inner tubes and adapted to float in said outer header.

2. In a high pressure heat exchanger, the combination of inlet and outlet header castings having means for securing two tubes in concentric relation, front connecting headers comprising castings provided with means for rigid attachment to two pairs of concentric tubes and rear connecting members consisting of two headers, one within the other, the outer one adapted for connection to the outer tubes, the inner header floating loosely in the outer header and adapted for removable connection to the two inner tubes to allow for unequal expansion between inner and outer tubes.

3. In a high pressure heat exchanger, the combination of a plurality of pairs of concentric tubes, an inlet and outlet header at one end adapted for connection to one pair of tubes and to connecting pipes, front headers comprising hollow castings having threaded openings for attachment to a pair of outer tubes, two smaller openings for attachment to a pair of inner tubes and a connecting flange provided with a passageway connecting said two inner tubes, and a series of rear connecting heads, each head comprising a hollow casting having two openings for attachment to a pair of outer tubes, and an inner header having two openings for removable attachment to a pair of inner tubes, the inner header floating in the hollow outer casting.

4. A front header for heat exchangers, comprising a hollow casting having two rearwardly extending interiorly threaded openings for attachment to two large threaded tubes, two forwardly extending smaller openings, with recesses on the interior of the casting to receive smaller tubes, the front face of the casting being surfaced and provided with annular recesses about said smaller openings, packing rings mounted in said recesses, and a connecting flange for said front openings having a passageway communicating with said openings, and means for securing said flange to said hollow casting.

5. A rear connecting head for use in high pressure heat exchangers, comprising a hollow casting open at one end and provided with two hollow extensions terminating in apertures, two apertured flanges adapted to be secured to the ends of large tubes and to be fastened to said casting about said apertures, and an inner head for small tubes consisting of a hollow casting open at one end and having two hollow interiorly threaded extensions adapted to be secured to the ends of small tubes and a plug for closing such open end, said inner head being loosely mounted in said outer casting and being adapted to float therein, and a closure flange for the open end of said outer casting.

6. A front header for concentric tube heat exchangers, comprising a hollow casting having an interior chamber and two rearwardly extending interiorly threaded apertures for attachment of the outer concentric tubes, the front side of the casting having two recesses about two apertures aligned with said two rear apertures, said recesses being adapted to receive nuts which are spaced from the ends of two concentric inner tubes, and a connecting flange having a passageway and two openings spaced to align with said two front apertures, each said opening being enlarged to receive a nut on the outer extending ends of said smaller tubes, and means to secure said flange tightly to said header casting.

Signed by us, this 11 day of July, 1924.

CHARLES F. RICHEY.
PAUL Y. DUFFEE.